United States Patent
Brown

(10) Patent No.: US 9,582,923 B2
(45) Date of Patent: *Feb. 28, 2017

(54) VOLUME RENDERING COLOR MAPPING ON POLYGONAL OBJECTS FOR 3-D PRINTING

(71) Applicant: FOVIA, INC., Palo Alto, CA (US)

(72) Inventor: Kenneth Brown, Ashland, OR (US)

(73) Assignee: FOVIA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,175

(22) Filed: Nov. 19, 2014

(65) Prior Publication Data

US 2015/0138201 A1   May 21, 2015

Related U.S. Application Data

(60) Provisional application No. 61/906,838, filed on Nov. 20, 2013.

(51) Int. Cl.
  *G06T 15/08* (2011.01)
  *G06T 15/06* (2011.01)
  *G06T 19/20* (2011.01)

(52) U.S. Cl.
  CPC ............. *G06T 15/08* (2013.01); *G06T 15/06* (2013.01); *G06T 19/20* (2013.01); *G06T 2219/2012* (2013.01)

(58) Field of Classification Search
  None
  See application file for complete search history.

(56) References Cited

U.S. PATENT DOCUMENTS

| | | | |
|---|---|---|---|
| 2001/0045955 A1* | 11/2001 | Oka | G06T 15/80 345/582 |
| 2004/0009459 A1* | 1/2004 | Anderson | G06F 19/3406 434/262 |
| 2005/0122324 A1 | 6/2005 | Venkataraman | |
| 2005/0143654 A1* | 6/2005 | Zuiderveld | G06T 15/08 600/443 |
| 2005/0237328 A1 | 10/2005 | Guhring | |
| 2006/0094951 A1 | 5/2006 | Dean et al. | |
| 2007/0012101 A1* | 1/2007 | Rottger | G06T 15/08 73/170.24 |
| 2009/0303236 A1* | 12/2009 | Buyanovskiy | G06T 15/08 345/426 |

(Continued)

OTHER PUBLICATIONS

International Search Report and Written Opinion received for PCT Patent Application No. PCT/US2014/066369, mailed on Feb. 19, 2015, 8 pages.

(Continued)

*Primary Examiner* — James A Thompson
*Assistant Examiner* — Tapas Mazumder
(74) *Attorney, Agent, or Firm* — Morrison & Foerster LLP

(57) ABSTRACT

Processes and systems for computer enabled volume data rendering, and more particularly for mapping of volume rendering colors upon polygonal model objects applied to computer enabled volume rendering are described. In one example, the mapping or encoding of the color of volume rendering data upon polygonal model objects located inside volumetric data is achieved by assigning the rendering result of voxels near the surface of the polygonal object.

19 Claims, 4 Drawing Sheets

(56) References Cited

U.S. PATENT DOCUMENTS

2012/0224755 A1* 9/2012 Wu .................. G06T 17/00
                                                382/131
2012/0261848 A1  10/2012 Haraszati
2013/0271449 A1* 10/2013 Lee .................. G06T 13/40
                                                345/419
2014/0362077 A1  12/2014 Buyanovskiy

OTHER PUBLICATIONS

Foley et al., "Computer Graphics Principles and Practices", 2nd Edition, Addison Wesley Publishing Company, 1996, pp. 1134-1139.
International Preliminary Report on Patentability received for PCT Patent Application No. PCT/US2014/066369, mailed on Jun. 2, 2016, 7 pages.

* cited by examiner

VOLUME RENDERING COLOR MAPPING ON POLYGONAL OBJECTS FOR 3-D PRINTING

CROSS-REFERENCE TO RELATED APPLICATION

This application claims priority to U.S. Provisional Patent Application Ser. No. 61/906,838, titled "METHOD AND SYSTEM FOR VOLUME RENDERING COLOR MAPPING ON POLYGONAL OBJECTS FOR 3-D PRINTING," filed on Nov. 20, 2013, which is incorporated by reference herein in its entirety for all purposes.

FIELD

This disclosure relates generally to computer graphics and depiction of images of objects using computer enabled imaging, and in one example to the representation of polygonal objects for 3-D printing.

BACKGROUND

Visualization of volumetric objects that are represented by three dimensional scalar fields is one of the most complete, realistic and accurate ways to represent internal and external structures of real 3-D (three dimensional) objects. As an example, Computer Tomography (CT) digitizes images of real 3-D objects (such as inside the human body) and represents them as a discrete 3-D scalar field representation. MRI (Magnetic Resonant Imaging) is another system to scan and depict internal structures (e.g. the human body) of real 3-D objects.

As another example, the petroleum industry uses seismic imaging techniques to generate a 3-D image volume of a 3-D region in the earth. As in the human body, some important structures, such as geological faults or salt domes, may be embedded within the region and are not necessarily on the exterior surface of the region.

Direct volume rendering is a well-known computer graphics technique for visualizing the interior of a 3-D region represented by such a 3-D image volume on a 2-D image plane, e.g., as displayed on a computer monitor. Hence a typical 3-D dataset is a group of 2-D image "slices" of a real object generated by the CT or MRI machine or seismic imaging. Typically the scalar attribute or voxel (volume element) at any point within the image volume is associated with a plurality of classification properties, such as color (e.g., red, green, and blue) and opacity, which can be defined by a set of lookup tables. During computer rendering, a plurality of "rays" is cast from the 2-D image plane into the volume and the rays are each attenuated or reflected by the volume. The amount of attenuated or reflected ray "energy" of each ray is indicative of the 3-D characteristics of the objects embedded within the image volume, e.g., their shapes and orientations, and further determines a pixel value on the 2-D image plane in accordance with the opacity and color mapping of the volume along the corresponding ray path. The pixel values associated with the plurality of ray origins on the 2-D image plane form an image that can be rendered by computer software on a computer monitor. Computer enabled volume rendering as described here may use conventional volume ray tracing, volume ray casting, splatting, shear warping, or texture mapping. A more detailed description of direct volume rendering is described in "Computer Graphics Principles and Practices" by Foley, Van Darn, Feiner and Hughes, 2nd Edition, Addison-Wesley Publishing Company (1996), pp 1134-1139.

In the CT example discussed above, even though a doctor using MRI equipment and conventional methods can arbitrarily generate 2-D image slices/cuts of an object (e.g., a human heart or knee) by intercepting the image volume in any direction, no single image slice is able to visualize the entire exterior surface of the object. In contrast, a 2-D image generated through direct volume rendering of the CT image volume can easily display on an associated computer monitor the 3-D characteristics of the object (e.g., a heart, which is very important in many types of cardiovascular disease diagnosis).

Similarly in the field of oil exploration, direct volume rendering of 3-D seismic data has proved to be a powerful tool that can help petroleum engineers to determine more accurately the 3-D characteristics of geological structures embedded in a region that are potential oil reservoirs and to increase oil production significantly.

One of the most common and basic structures used to control volume rendering is the transfer function. In the context of volume rendering, a transfer function defines the classification/translation of the original pixels of volumetric data (voxels) to its representation on the computer monitor screen, particularly the commonly used transfer function representation which is color (e.g., red, green, and blue) and opacity classification (often referred to as "color and opacity"). Hence each voxel has a color and opacity value defined using a transfer function. The transfer function itself is mathematically (e.g., a simple ramp) a piecewise linear function or a lookup table. Computer enabled volume rendering as described here may use conventional volume ray tracing, volume ray casting, splatting, shear warping, or texture mapping. More generally, transfer functions in this context assign renderable (by volume rendering) optical properties to the numerical values (voxels) of the data-set. The opacity function determines the contribution of each voxel to the final (rendered) image.

A common need of volume rendering applications is the extraction of traditional computer graphics polygonal objects from volumetric data. A polygon in computer graphics is a 2-D shape, e.g., a mesh represented in 3-D space. A polygonal in computer graphics can be used to represent a 3-D manifold with an infinitely thin surface, thus visualizing only a tiny subset of the actual object being represented. Its position is defined by the XYZ coordinates of its vertices (corners). Volumetric data and polygonal object models representing the volumetric data are different kinds of data in this field; volumetric data is a 3-D array of pixels while the well-known polygonal object model is a list of polygonal objects such as triangles or rectangles, which are each represented by a grouping of correspondent XYZ vertices with assigned colors at each vertex. In volumetric data, the 3-D array of pixels is used to visualize all internal and external structures of the object, rather than the infinitely thin manifold on the outside of the object.

Even though direct volume rendering plays a key role in many important fields, currently available 3-D printing devices expect as input a polygonal object representation of 3-D objects to be printed. Thus, porting the visual information from volume rendered images to polygonal object models is a significant technical problem.

BRIEF SUMMARY

The present disclosure relates generally to the field of computer enabled volume data rendering, and more particularly to a method and system for depicting an image and providing data suitable for 3-D printing. In one example, a computer enabled method includes providing a volumetric data-set representing an image in 3 dimensions (e.g., a CT or MRI volumetric data-set), wherein the data-set includes a plurality of elements, applying a transfer function to the volumetric data set to generate a color for each of the elements, and accumulating the color of the elements using volume rendering computed along each ray crossing each vertex of a polygonal object interfaced with (e.g., located/placed inside/across) volumetric data. The exemplary process may then map the volume rendered result to each vertex of the polygonal object, thereby providing a data set for 3-D printing. The data set for 3-D printing can then be displayed and/or output to a 3-D printer to cause printing of an object.

Some examples may further include interpolating the color of vertices upon the surfaces of correspondent triangles of the polygonal object. The volume rendering may include volumetric ray-tracing, volumetric ray-casting, splatting, shear warping, or texture mapping. The transfer function may include a ramp function, a piecewise linear function, or a lookup table, and further, a user may input or establish for the transfer function a relation of the value of volumetric data and the correspondent color mapped to the vertices of the polygonal object. The exemplary process can further display the mapped result and a depiction of the transfer function, including a plurality of control points, and accept input at each control point to select a value of the parameter for a portion of the mapped result associated with that control point.

Accordingly, exemplary processes and systems described herein map or port volume rendered data to the vertices of polygonal model located inside the volumetric data; particularly, the accumulated color output of volume rendering from a ray cast through each vertex location is used to acquire a correspondent red-green-blue color component and to assign that color component to the vertex. The assigned color components can then be linearly interpolated upon the surfaces of correspondent triangles, allowing visualization of the color of the volumetric image intersecting with surfaces of the polygonal object located inside the volume.

Additionally, systems and electronic devices are provided having at least one processor and memory, the memory comprising computer readable instructions for causing the electronic device to perform the processes described herein. Further, computer readable storage medium, comprising computer readable instructions for causing the processes described herein are provided.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE INVENTION

Figure 1A:
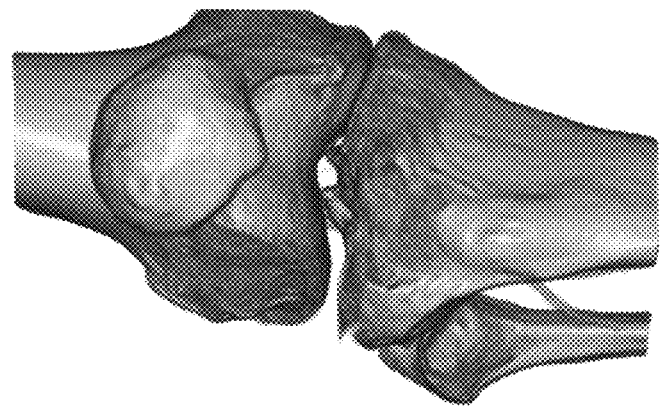
FIG. 1A illustrates a traditional volume render of an object.

The aforementioned features and advantages of the invention as well as additional features and advantages thereof will be more clearly understood hereinafter as a result of a detailed description of embodiments of the invention when taken in conjunction with the drawings. The description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Presently available 3-D printers use a technology known as additive manufacturing, which sequentially deposits layers of plastic or metal particles to define a 3-D item such as a machine part. The particles are typically fused together by applying heat. It is possible in many such machines to deposit colored particles, so that the exterior of the printed item has areas of various colors, e.g., 10 or more different colors. The 3-D printing industry has standardized on an open standard computer data standard known as AMF (Additive Manufacturing File) format to specify the item to be printed, so 3-D printers generally only accept data input in the form of AMFs. An AMF conventionally represents the item as a set of non-overlapping volumes, where each volume represented as a triangular (polygonal model) mesh that references a set of vertices (AMF further supports colorization). Accordingly, AMF format requires conventional polygonal object modeling data, using triangles as the polygons, so there are 3 vertices per triangle. In other words, present 3-D printers generally cannot directly use volumetric type data. Further, Computer Aided Design System (CAD) outputs are in polygonal form, so 3-D printers typically use polygons as well.

This relates generally to processes and systems for the projection of volume rendering output upon a polygonal object to improve the visual appearance of 3-D printed items. One advantage that volume rendering has over polygonal object models is the ability to reveal inner structural detail of the data. By projecting the volume rendering output onto the polygonal object model in accordance with the invention, the inner structural detail of the object can be imprinted onto the polygonal object model output to make the polygonal object look more like the result of volume rendering procedures.

Accordingly, one embodiment of the present invention includes projecting volumetric color information created by volume rendering upon the surface of polygonal objects representing the volumetric data. In one example, this includes mapping the output of a localized volume rendering operation to the vertices of a polygonal model. Exemplary process described herein may be especially useful in the context of printing (manufacturing) of 3-D items using 3-D printers, to achieve an improved appearance of the surface of the printed items.

Figure 1B:
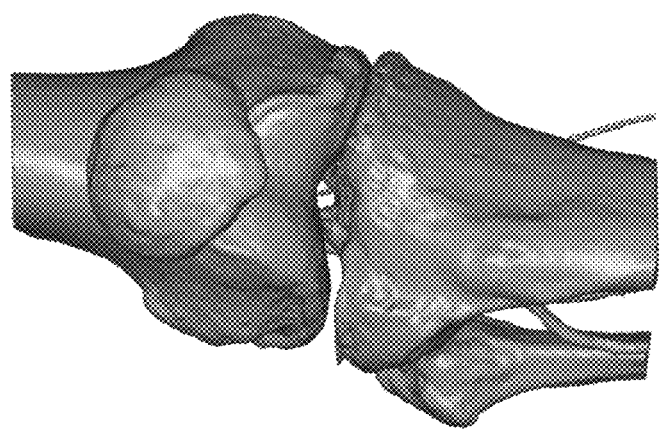
FIG. 1B illustrates an exemplary surface of a polygonal model with a flat white color for vertices.
Figure 1C:
FIG. 1C illustrates an exemplary color mapping from volume render output data to the surface of a polygonal model object.

FIGS. 1A-1C illustrate, in accordance with one embodiment described herein, color mapping from volume rendering output data to the surface of a polygonal modeled object (in this example, bones of a knee). In particular, FIG. 1A illustrates a knee region rendered using volume rendering, e.g., conventional direct volume rendering from a CT or MRI scan. (Note that embodiments of the invention extend beyond input CT or MRI data to the application of any volumetric data to any polygonal data; further, embodiments of this invention are not limited to this particular example which illustrates one case where it may be applied.) FIG. 1B illustrates the knee region extracted into a polygonal mesh with a flat color applied to the vertices. FIG. 1C illustrates the knee region polygon object with the technique applied here, and is generated from data suitable for 3-D printing. Thus, the example process, described in greater detail below, transforms conventional volumetric data, associated with the image in FIG. 1A, into data including a list of vertices and color applied to the vertices, which is more suited for color 3-D printing.

As illustrated, by inputting the polygonal model object and the volumetric data to the exemplary process and system, the process and system may apply the volume rendering result to the polygonal model object where previously no such color information existed, as shown in the transformation from FIG. 1A to FIG. 1B.

Figure 2A:
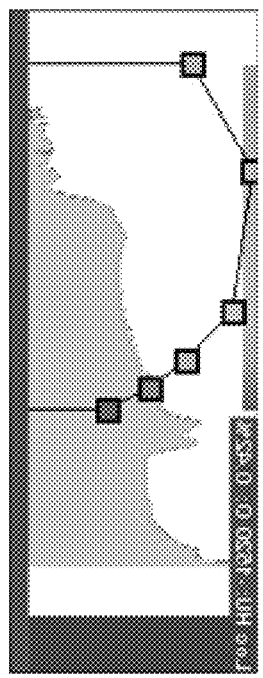
FIG. 2A illustrates an exemplary volume rendering transfer function used to map scalar pixel values to color and opacity.

In this particular example, the polygonal modeled knee region receives its colors from the volume rendering result obtained by applying a conventional transfer function illustrated in FIG. 2A. The transfer function of FIG. 2A conventionally has as its horizontal axis the scalar volumetric pixel data values and as its vertical axis color/opacity. Further this transfer function is manipulable conventionally using a graphical user interface at its user control nodes.

Figure 2B:
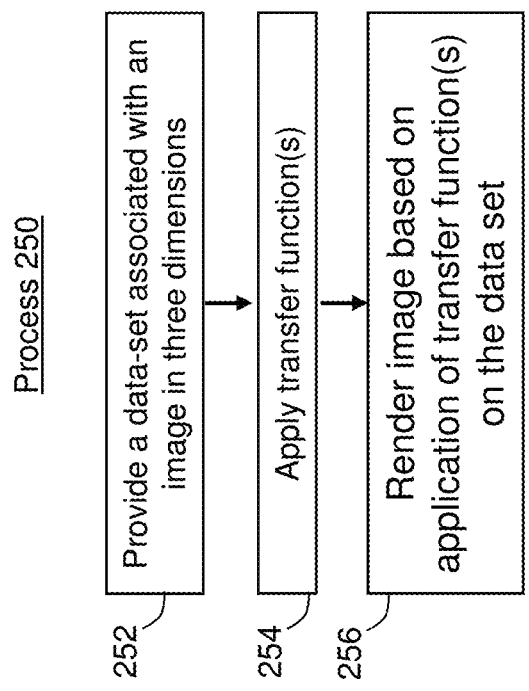
FIG. 2B illustrates an exemplary process for using a transfer function to map scalar pixel values to color and opacity for the surface of a polygonal model object.

FIG. 2B illustrates an exemplary process 250 for volume rendering using a transfer function. The exemplary process begins at 252 by providing a data-set associated with an image in three dimensions, e.g., a 3-dimensional CT or MRI volumetric data set representation of a knee. The data set includes a plurality of elements, for example, a plurality of 2D images representing slices across a patient's knee, each slice containing a plurality of pixel data points representing specific points in the knee. The process, at 254, further uses one or more transfer functions, where each transfer function defines a correspondence of scalar field values (e.g., pixel values) to color values and opacity values. The number of transfer functions may be determined by application needs and available memory, for instance, a single object may need only one transfer function, where as if it is desired to image different parts of an object, e.g., different organs, bones, etc., multiple transfer functions can be used to show them differently, if desired. Each of the transfer functions is further associated with a subset of elements of data (e.g., of a group of pixels) for controlling the color and opacity thereof. For example, each subset of elements can be associated with a different element to be rendered, such as different bones, different organs, and so on. Finally, process 250, after applying the transfer functions to the data set, cause an image to be rendered and displayed based thereon at 256. Additional aspects of volume rendering are described, e.g., in co-pending patent application Ser. No. 14/296,092, filed on Jun. 4, 2014, and entitled "VOLUME RENDERING OF IMAGES WITH MULTIPLE CLASSIFICATIONS," which is incorporated herein by reference in its entirety.

Figure 3:
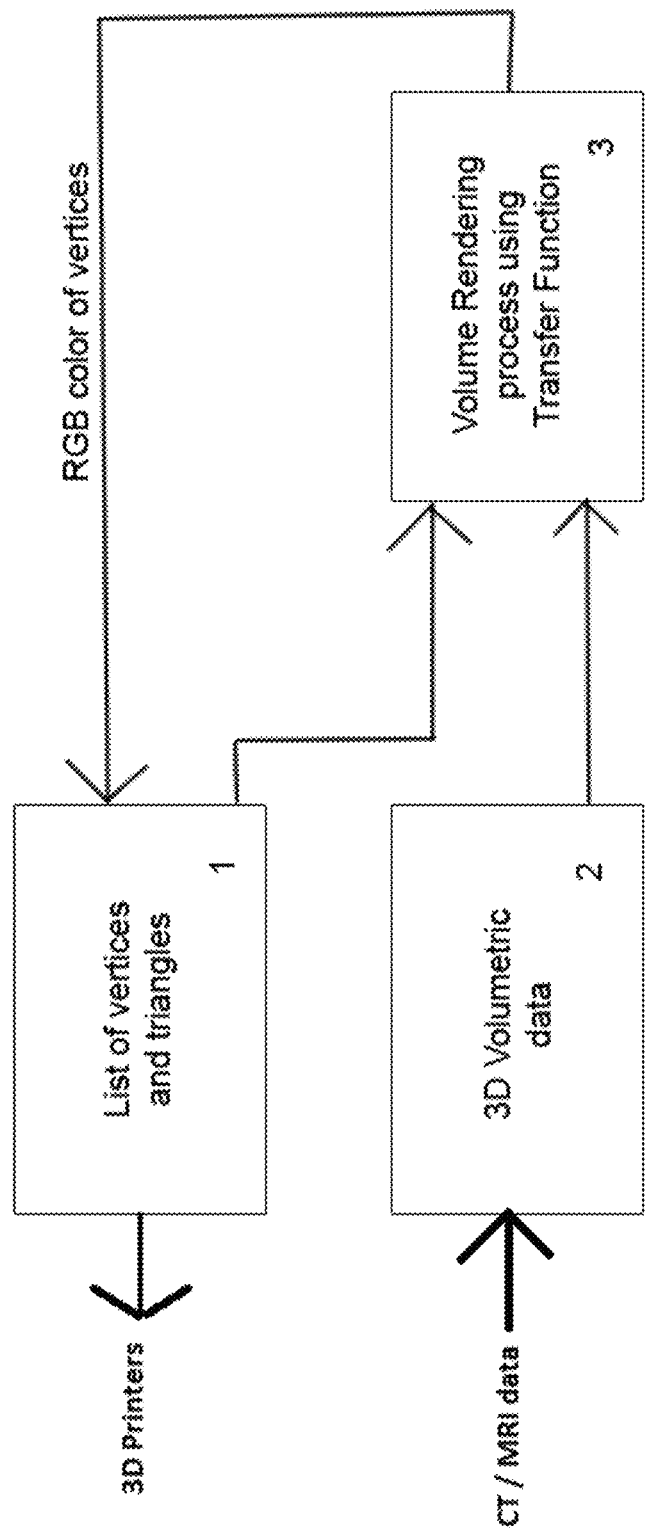
FIG. 3 illustrates a block diagram of relevant portions of an exemplary process and system.

FIG. 3 illustrates an exemplary process and system for providing data for 3-D printing according to one embodiment. The volume rendering process (e.g., ray casting) of module 3 (executed on a computer processor) includes several main portions. Initially, the exemplary process performs ray casting on, for example, input volumetric CT or MRI (or other) volumetric data values conventionally stored in computer readable memory in module 2, which includes or depends on applying a transfer function (e.g., the transfer function of FIG. 2A, or other desired transfer function) to the processed input volumetric CT or MRI data, thereby providing RGB color data near or at each vertex. The process can then perform color interpolation near each polygonal object vertex located at or near the surface of the item, where this data is conventionally stored in memory in module 1. The use of "near" here is meant to indicate adjacent or local, since the volumetric pixels do not lie exactly on the polygonal vertices. The process produces a RGB color vertex result to apply back to the otherwise conventional list of polygonal model vertices and triangles of module 1. So the process applies the RGB color output of the volume rendering process to the color attribute of the vertex definition. Vertex definitions for a polygonal object can have many attributes, but for this process, three exemplary attributes are location (XYZ), normal (XYZ), and color (RGB).

Thus, module 1 depicts the polygon object data structure (polygonal mesh) stored in computer readable memory as a list of vertexes (conventional XYZ coordinates for each vertex) and the conventional associated list of triangles, which is composed from the correspondent triplets of vertexes from the vertex list. Module 2 is the conventional volumetric data structure as stored in computer readable memory which is, for example, conventionally a list of two dimensional slice images stacked into a three dimensional volume. It should be understood by those of ordinary skill in the art that the particular method of how the polygonal mesh data is acquired or generated is not important and may be by any conventional method(s), but generally the polygonal surface-mesh lies along the item's iso-surface. The polygonal object data of module 1 as so modified by module 3 is conventionally transmitted to a 3-D printer as an AMF or similar data file.

Accordingly, the exemplary process and system uses the volumetric data (pixels) located inside the surface of the item being depicted or printed to determine the representation (color and opacity) of the nearby surface of the polygonal model object. The item's surface as printed by a 3-D printer thereby illustrates, using colors, the nature (e.g., density) of the underlying structure. The different density profiles under the surface may cause different color outputs for the ray-casting procedures. For example, in the human body more "spongy" like bone tissue under a surface may have a different surface color than is the case for underlying hard bone. Even if each point upon the item's iso-surface has identical density so it has the same color represented by the transfer function, underlying densities may be different so these differences cause different color outputs by the ray-casting procedure. Thereby, the output data to the 3-D printer advantageously is a more lifelike depiction of the data because the process introduces subsurface optical properties of the iso-surface to the item being depicted. Color, texture, luminance, and other properties of a surface can come out when the item would otherwise appear to be flat (without use of the exemplary process). Of course this exterior (surface) coloration may be limited by the color printing capability of the associated 3-D printer.

Note that the present processes and systems are not limited to 3-D printing and are applicable to computer animation (for games, films, etc.) and other computer graphics techniques requiring polygonal object model data for the output but using volumetric data as the original data. Essentially, the exemplary processes allows generation of textures from real objects that is conventionally done by "texture artists."

The present method in some embodiments performs its volume rendering (module 3) using a ray casting or other known method. This projects a ray through the mesh of vertices defined by the polygon (triangles) to delineate a local gradient. The ray-casting process casts each ray along some direction. The most appropriate direction is to cast each ray parallel to a gradient of the volumetric data scalar field at each vertex location, but other alternatives are conceivable as well, such as normals to the surrounding polygons or their average, for example. Gradient refers to a mathematical property of a field. In this case, the field is the 3-D collection of scalar volumetric data values at discrete intervals. The gradient, in the simple sense, describes the "direction" of this data, or the direction in which it is increasing most rapidly from a given point. Conventionally the data (colors) are accumulated along the ray path.

In some implementations, the exemplary processes and apparatuses to map the color volume rendering output data upon the surface of a polygonal object inserted inside volumetric data is embodied in computer software (code or a program) to be executed on an otherwise conventional programmed computer or computing device. This code may be a separate application program and/or embedded in the polygonal model representation. The input data-set (e.g., the CT data) may be provided live (in real time from a CT or MRI scanner or other source) or from data storage, so the software may be resident in a standalone computer or in the computing portions of e.g. a CT or MRI machine or other platform. The computer software itself (coding of which would be routine in light of this disclosure) may be encoded in any suitable program language and stored on a computer readable medium in source code or compiled form. The output images of FIGS. 1A-1C themselves are typically also stored in a computer readable medium (memory) in the computer.

Figure 4:
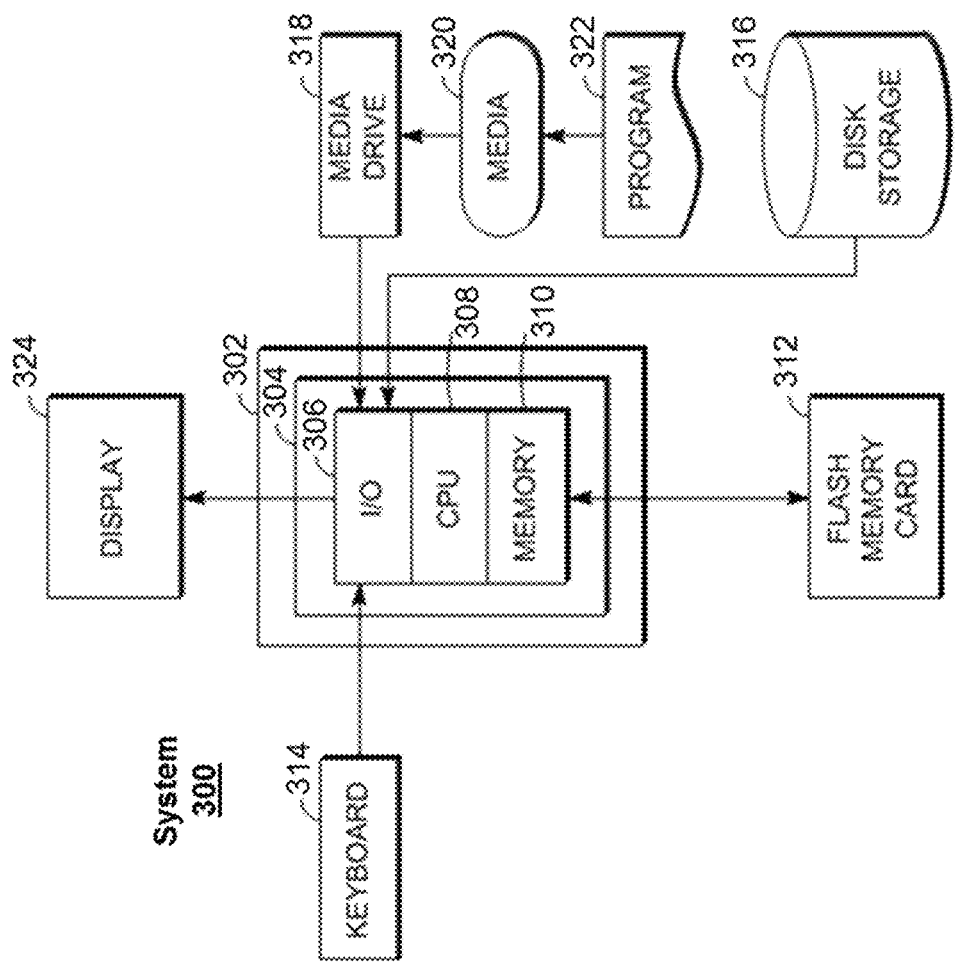
FIG. 4 depicts an exemplary block diagram a computer apparatus for the FIG. 3 method and apparatus.

FIG. 4 illustrates an exemplary computing system 300 configured to perform any one of the above-described processes, and which may represent a client device, server, gateway, router, data application service, for example, is provided below. In this context, computing system 300 may include, for example, a processor, memory, storage, and input/output devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, firmware, or some combination thereof.

The exemplary computing system 300 includes a number of components that may be used to perform the above-described processes. The main system 302 includes a motherboard 304 having an input/output ("I/O") section 306, one or more central processing units ("CPU") 308, and a memory section 310, which may have a flash memory card 312 related to it. The I/O section 306 is connected to a display 324, a keyboard 314, a disk storage unit 316, and a media drive unit 318. The media drive unit 318 can read/write a computer-readable medium 320, which can contain programs 322 and/or data.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

In this disclosure, the terms "computer program product," "computer-readable medium" and the like may be used generally to refer to media such as, for example, memory 310, storage devices such as media drive 318, disk storage 316, or flash memory card 312. These and other forms of computer-readable media may store one or more instructions for use by CPU 308, to cause the processor to perform specified operations. Such instructions, generally referred to as "computer program code" (which may be grouped in the form of computer programs or other groupings), when executed, enable the computing system 300 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 300 using, for example, removable media drive 318, flash memory 312, or communications interface 306. The control logic (in this example, software instructions or computer program code), when executed by the processor 308, causes the processor 308 to perform the functions of embodiments of the invention as described herein.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language. Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments. All such modifications are intended to be within the scope of claims associated with this disclosure.

We claim:

1. A computer enabled method of depicting an image, comprising:
at a device having one or more processors and memory:
providing a volumetric data-set generated from a scan of a 3 dimensional object, wherein the data-set includes a plurality of elements;
applying a transfer function to the volumetric data set to generate a color for each of the elements;
accumulating the color of the elements using volume rendering in a local region of each vertex of a polygonal object;
mapping a color output of the volume rendering to each vertex of the polygonal object interfacing with elements of the volumetric data-set;
displaying the mapped color of the polygonal object; and
outputting the mapped color to a 3D printer.

2. The method of claim 1, further comprising interpolating the color of vertices upon the surfaces of correspondent triangles of the polygonal object.

3. The method of claim 1, further comprising establishing for the transfer function a relation of the value of volumetric data along a ray crossing the vertex and the correspondent color output of the volume rendering procedure computed for the ray crossing the vertex of the polygonal object.

4. The method of claim 1, wherein the volume rendering comprises performing one or more of:
volumetric ray-tracing, volumetric ray-casting, splatting, shear warping, and texture mapping.

5. The method of claim 1, wherein the transfer function comprises one or more of:
a ramp function, a piecewise linear function, and a lookup table.

6. The method of claim 1, further comprising:
displaying the mapped color and a depiction of the transfer function including a plurality of control points; and
accepting input at each control point to select a value of a parameter for a portion of the mapped color associated with that control point.

7. The method of claim 1, further comprising printing an object based on the mapped color.

8. The method of claim 1, further comprising causing a 3-D printer to print an object using the mapped color.

9. A computing device programmed to carry out the method of claim 1.

10. A non-transitory computer-readable storage medium storing the mapped result produced by the method of claim 1.

11. A non-transitory computer readable storage medium storing computer code to carry out the method of claim 1.

12. Apparatus for depicting an image, comprising:
one or more processors; and
memory having instructions stored thereon, the instructions, when executed by the one or more processors, cause the processors to perform operations comprising:
accessing a volumetric data-set generated from a scan of a 3 dimensional object, wherein the data-set includes a plurality of elements;
accessing a transfer function that defines a color for each of the plurality of elements of the volumetric data-set;
mapping a color output of the volume rendering to each vertex of the polygonal object interfacing with elements of the volumetric data-set;
displaying the mapped color of the polygonal object; and
outputting the mapped color to a 3D printer.

13. The apparatus of claim 12, wherein the color of the vertices is interpolated upon the surfaces of correspondent triangles of the polygonal object.

14. The apparatus of claim 12, wherein a user establishes for the transfer function a relation of the value of volumetric data along a ray crossing the vertex and the correspondent color output of the volume rendering procedure computed for the ray crossing the vertex of the polygonal object.

15. The apparatus of claim 12, wherein the volume rendering includes performing one or more of:
volumetric ray-tracing, volumetric ray-casting, splatting, shear warping, and texture mapping.

16. The apparatus of claim 12, wherein the transfer function is one or more of:
a ramp function, a piecewise linear function, and a look-up table.

17. The apparatus of claim 12, further comprising:
the processor displaying the mapped colors and a depiction of the transfer function including a plurality of control points; and
accepting input from a user at each control point to select a value of a parameter for a portion of a projection associated with that control point.

18. The apparatus of claim 12, further comprising a 3-D printing device coupled to the processor so as to receive the mapped colors.

19. Apparatus for depicting an image, comprising:
a first computer readable storage comprising a volumetric data-set representing an image in 3 dimensions, wherein the data-set includes a plurality of elements;
a second computer readable storage comprising a transfer function which defines a color for each of the elements; and
a processor coupled to the first and second storages and operable to map a color output of a volume rendering to each vertex of the polygonal object interfacing with elements of the volumetric data-set.

* * * * *